United States Patent
Chang

(10) Patent No.: US 8,249,525 B2
(45) Date of Patent: Aug. 21, 2012

(54) MOBILE ELECTRONIC DEVICE AND METHOD FOR LOCATING THE MOBILE ELECTRONIC DEVICE

(75) Inventor: Tang-Yu Chang, Taipei Hsien (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 299 days.

(21) Appl. No.: 12/564,717

(22) Filed: Sep. 22, 2009

(65) Prior Publication Data
US 2010/0216446 A1 Aug. 26, 2010

(30) Foreign Application Priority Data
Feb. 23, 2009 (CN) .......................... 2009 1 0300513

(51) Int. Cl.
*H04M 11/00* (2006.01)
(52) U.S. Cl. ........ 455/79; 455/418; 455/563; 455/404.2
(58) Field of Classification Search .................. None
See application file for complete search history.

(56) References Cited

U.S. PATENT DOCUMENTS

| 2006/0287005 A1* | 12/2006 | Benco et al. | 455/567 |
| 2007/0099601 A1* | 5/2007 | Yang et al. | 455/418 |
| 2008/0309485 A1* | 12/2008 | Raduchel | 340/540 |
| 2009/0081986 A1* | 3/2009 | Traylor | 455/404.2 |
| 2009/0318197 A1* | 12/2009 | Ron et al. | 455/567 |

* cited by examiner

*Primary Examiner* — Marcos Batista
*Assistant Examiner* — Frank Donado
(74) *Attorney, Agent, or Firm* — Altis Law Group, Inc.

(57) ABSTRACT

A mobile electronic device stores a standard voice command and a voice command identification standard. When an incoming call is regarded as a missed call and a voice command is detected, the mobile electronic device compares characteristics of the voice command with characteristics of the standard voice command, so as to determine if the voice command satisfies the voice command identification standard. The mobile electronic device further activates a ringing circuit to play a predetermined ring tone in response that the voice command satisfies the voice command identification standard, so as to help a user locate the mobile electronic device even if the mobile electronic device is in a silent mode.

16 Claims, 3 Drawing Sheets

MOBILE ELECTRONIC DEVICE AND METHOD FOR LOCATING THE MOBILE ELECTRONIC DEVICE

BACKGROUND

1. Technical Field

Embodiments of the present disclosure are related to electronic devices, and particularly to a mobile electronic device and a method for locating the mobile electronic device.

2. Description of Related Art

Mobile electronic devices, such as mobile phones, are common in people's lives. However, people may accidentally misplace their mobile phones. To find a misplaced phone, a user may call the phone from another phone and listen to hear the ring tone for their phone. However, if the mobile phone is in a silent mode, calling the mobile phone will not help.

Therefore, there is a need for a mobile phone and method to overcome the aforementioned problem.

DETAILED DESCRIPTION

All of the processes described may be embodied in, and fully automated via, functional code modules executed by one or more general purpose computers or processors. The code modules may be stored in any type of computer-readable medium or other storage device. Some or all of the methods may alternatively be embodied in specialized computer hardware or electronic apparatus.

Figure 1:
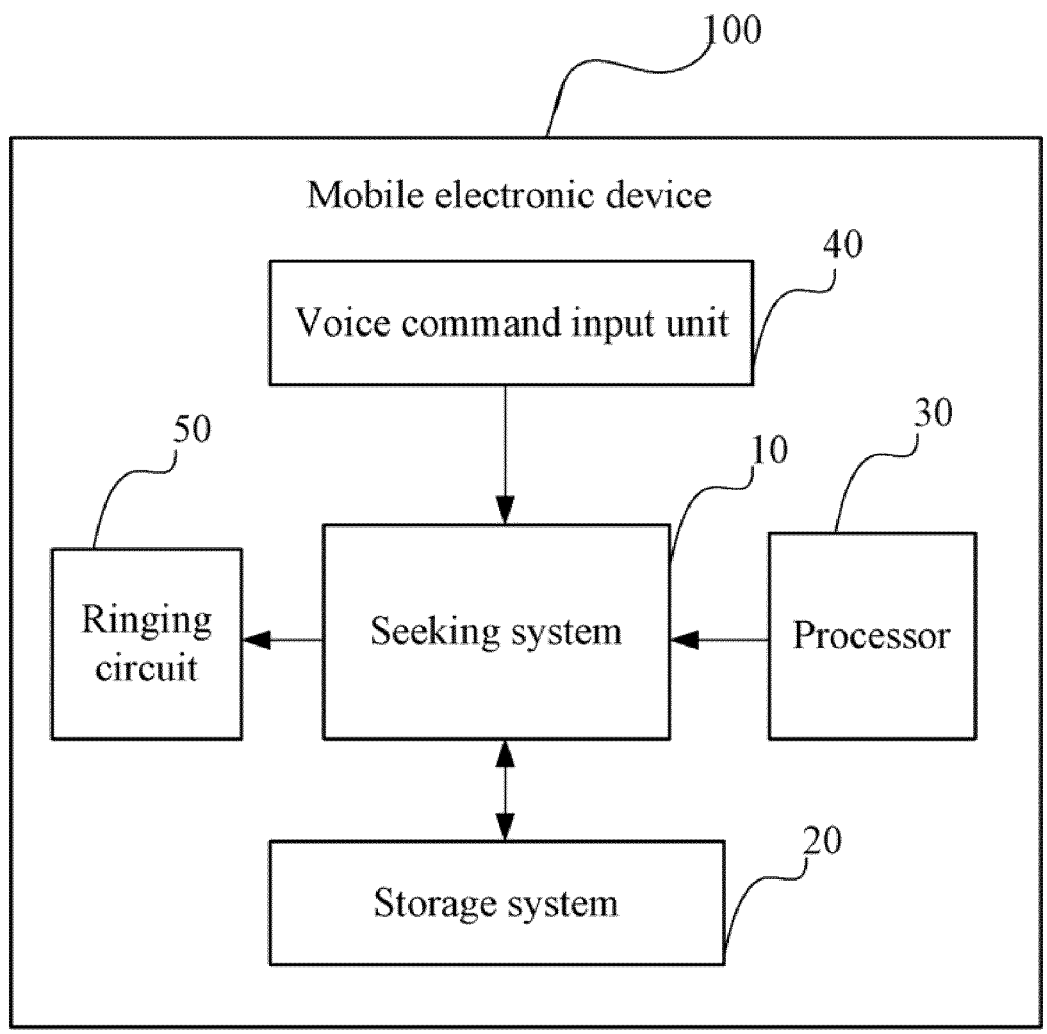
FIG. 1 is a block diagram of one embodiment of a mobile electronic device comprising a seeking system for locating the mobile electronic device.

FIG. 1 is a block diagram of one embodiment of a mobile electronic device 100 comprising a seeking system 10 for locating the mobile electronic device 100. In this embodiment, the mobile electronic device 100 further includes a storage system 20, a processor 30, a voice command input unit 40, and a ringing circuit 50. When the mobile electronic device 100 is in a silent mode, and a received call is regarded as a missed call, the seeking system 10 may receive a voice command input by a user via the voice command input unit 40. Furthermore, the seeking system 10 may compare the input voice command with a pre-recorded standard voice command. If the input voice command satisfies a voice identification standard, the seeking system 10 may activate the ringing circuit 50 to play a predetermined ring tone. In other words, when a user misplaces his phone, he can first call his phone from another phone to listen for the ring tone. If the phone is in a silent mode, the unanswered call activates the seek function of the phone, where the user can speak a predetermined command, for the phone to respond with a ring tone, thus making the phone easier to find.

In one embodiment, the standard voice command and the voice identification standard may be audio files that are stored in the storage system 20. The storage system 20 also stores one or more computerized codes of the seeking system 10. The processor 30 executes the one or more computerized codes of the seeking system 10, to provide function of the seeking system 10 described above.

Depending on the embodiment, the mobile electronic device 100 may be a mobile phone, a personal digital assistant, or any other suitable portable electronic device. The storage system 20 may be a read only memory (ROM), an electrically erasable, programmable, read only memory (EEPROM), a random access memory (RAM), or any other kind of memory. The voice command input unit 40 may be a microphone or any other electronic device that may record and/or recognize voice commands.

Figure 2:
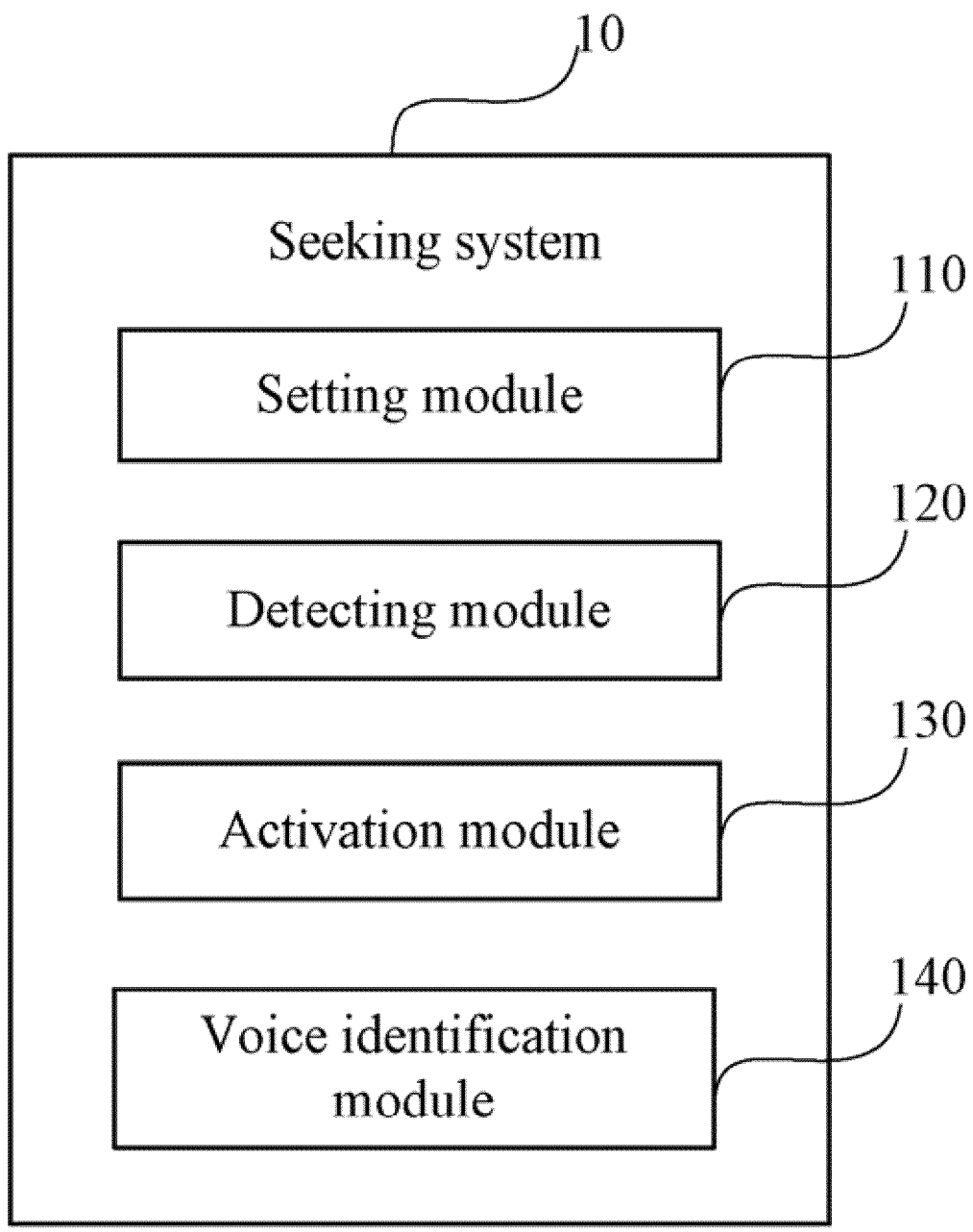
FIG. 2 is a block diagram of function modules of the seeking system in FIG. 1.

FIG. 2 is a block diagram of function modules of the seeking system 10 in FIG. 1. In one embodiment, the seeking system 10 includes a setting module 110, a detecting module 120, an activation module 130, and a voice identification module 140.

The setting module 110 receives the standard voice command input by the user. The standard voice command may be audio files that have been pre-recorded using the voice command input unit 40. For example, the standard voice command may be the phrase, "one, two, three, four." It may be understood that the user may be a manufacturer of the mobile electronic device 100, or a buyer of the mobile electronic device 100. If the standard voice command is input by the manufacturer or other users, the buyer may listen to a record of the standard voice command, so as to control pronunciation when speaking to the voice command input unit 40 so as to input the standard voice command correctly.

The setting module 110 further receives the voice command identification input by the user. In one embodiment, the voice command identification standard defines a similarity degree between characteristics of any voice command and the characteristics of the standard voice command For example, the similarity degree may be set as 30%. The characteristics of a voice command may comprise a frequency, amplitude, a volume and a pulse width of the voice command.

The detecting module 120 detects if the mobile electronic device 100 receives a new call, and detects if the new call is regarded as a missed call.

The activation module 130 activates the voice identification module 140, in response that the new call detected by the detecting module 120 is regarded as a missed call.

The detecting module 120 further detects a voice command, such as a current pronunciation of "one, two, three, four" input by the user via the voice command input unit 40.

The voice identification module 140 compares the characteristics of the voice command with the characteristics of the standard voice command, determines if the voice command satisfies the voice command identification standard. For example, the voice identification module 140 compares each character (e.g., the frequency) of the voice command with a corresponding character (e.g., the frequency) of the standard voice command, to determine if the similarity degree between each characteristic of the voice command and the corresponding characteristic of the standard voice command is more than or equal to 30%.

The activation module 130 activates the ringing circuit 50 to play a predetermined ring tone (e.g., a song) in response that the voice command satisfies the voice command identification standard (e.g., degree of similarity >=30%), so that the user may find the mobile electronic device 100 according to the predetermined ring tone. After playing of the ring tone, for example, the user may pausing the playing of the ring tone once the mobile electronic device 100 has been located, so that the activation module 130 will shut down the voice identification module 140 automatically.

Figure 3:
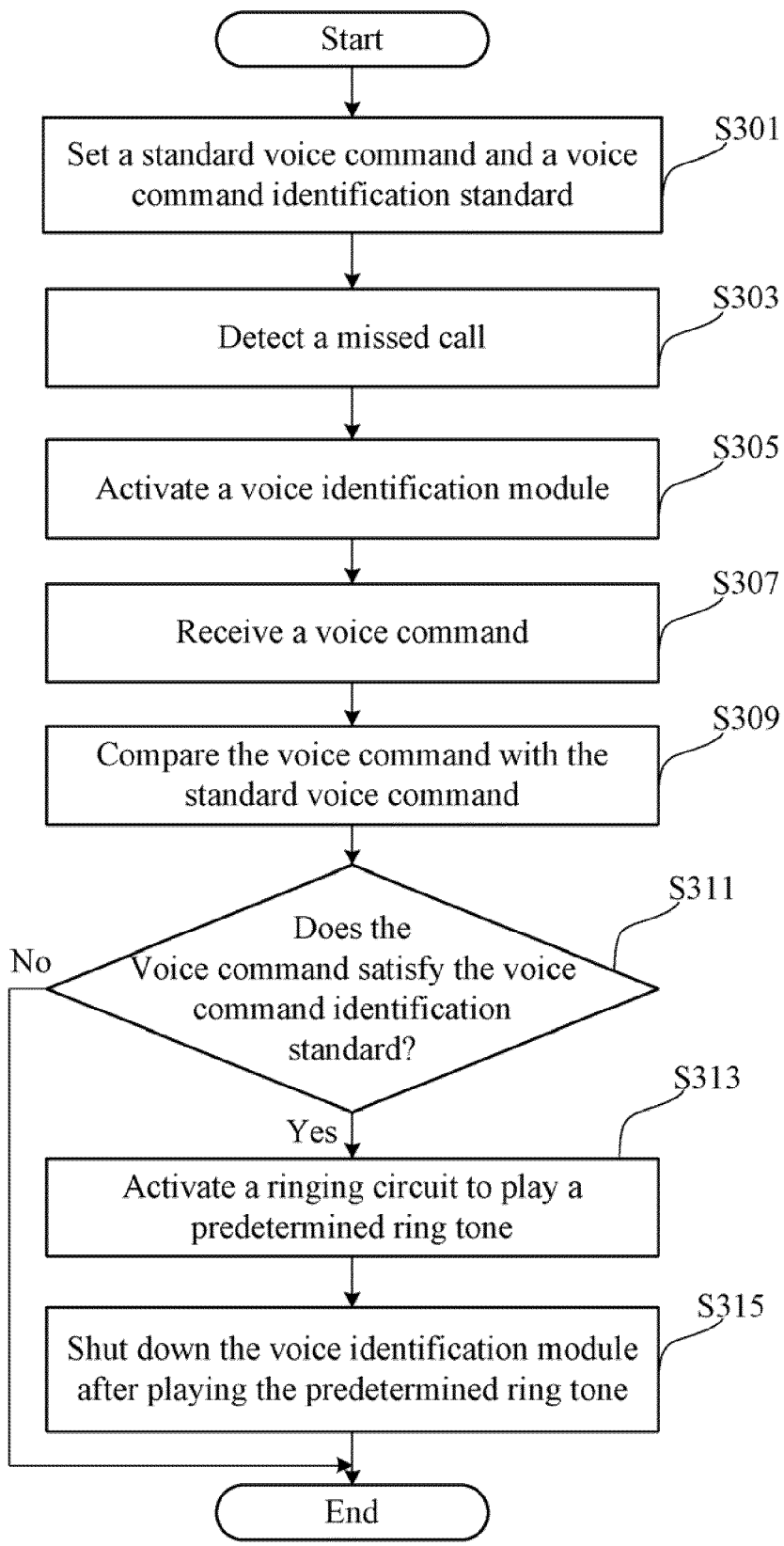
FIG. 3 is a flowchart of one embodiment of a method for locating the mobile electronic device having the seeking system in FIG. 1.

FIG. 3 is a flowchart of one embodiment of a method for locating the mobile electronic device 100 having the seeking system 10 in FIG. 1. Depending on the embodiment, additional blocks may be added, others removed, and the ordering of the blocks may be changed.

In block S301, the setting module 110 receives a standard voice command and a voice command identification input by the user of the mobile electronic device 100. For example, the standard voice command may be the phrase "one, two, three, four." As mentioned above, the voice command identification standard defines a similarity degree between characteristics of any common voice command and the characteristics of the standard voice command. For example, the similarity degree may be set as 30%. The characteristics of a voice command may comprise a frequency, amplitude, a volume and a pulse width of the voice command.

In block S303, the detecting module 120 detects a missed call received by the mobile electronic device. Because the mobile electronic device 100 is in a silent mode, an incoming call may be regarded as a missed call.

In block S305, the activation module 130 activates the voice identification module 140.

In block S307, the detecting module 120 detects a voice command, such as a current pronunciation of "one, two, three, four" input by the user via the voice command input unit 40. For example, the voice command input unit 40 may be a microphone.

In block S309, the voice identification module 140 compares characteristics of the voice command with characteristics of the standard voice command For example, the voice identification module 140 respectively compares a frequency, amplitude, a volume and a pulse width of the voice command with a frequency, amplitude, a volume and a pulse width of the standard voice command.

In block S311, the voice identification module 140 determines if the voice command satisfies the voice command identification standard. For example, the voice identification module 140 determines if the similarity degree between each characteristic of the voice command and a corresponding characteristic of the standard voice command is more than or equal to 30%. If the common voice command satisfies the voice command identification standard (e.g., the degree of similarity >=30%), the procedure goes to block S313. Otherwise, if the voice command does not satisfy the voice command identification standard (e.g., degree of similarity <30%), the procedure ends.

In block S313, the activation module 130 activates the ringing circuit 50 to play a predetermined ring tone, such as a song, for example.

In block S315, after playing of the predetermined ring tone, for example, the user may pausing the playing once the mobile electronic device 100 has been located, the activation module 130 shuts down the voice identification module 140 automatically.

According to above embodiments, even if a mobile electronic device is in a silent mode, a user of the mobile electronic device can locate the mobile electronic device via calls and voice commands. Furthermore, the seeking function is shut down upon the condition that no call is received by the mobile electronic device, so as to save power of the mobile electronic device.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A mobile electronic device, comprising:
   a storage system;
   at least one processor; and
   one or more programs stored in the storage system to be executed by the at least one processor, the one or more programs comprising:
   a setting module operable to receive a standard voice command input via a voice command input unit by a user of the mobile electronic device, receive a voice command identification standard input by the user, and store the standard voice command and the voice command identification standard in the storage system, wherein the voice command identification standard defines a preset similarity degree between characteristics of any voice command that satisfies the voice command identification standard and characteristics of the standard voice command;
   a detecting module operable to detect a missed call received by the mobile electronic device; and
   an activation module operable to automatically activate a voice identification module in response that the missed call is detected,
   where said voice identification module is activated only upon receiving a missed call while said mobile device is in a silent mode, the voice identification module operable to determine if a voice command input via the voice command input unit satisfies the voice command identification standard by determining if a similarity degree between each characteristic of the voice command and a corresponding characteristic of the standard voice command satisfies the preset similarity degree, and
   the activation module further operable to activate a ringing circuit of the mobile electronic device to play a predetermined ring tone in response that the voice command satisfies the voice command identification standard, so as to help the user locate the mobile electronic device according to the ring tone.

2. The mobile electronic device of claim 1, wherein the activation module is further operable to shut down the voice identification module after playing of the predetermined ring tone.

3. The mobile electronic device of claim 1, wherein the characteristics of each voice command comprise a frequency, amplitude, a volume and a pulse width of the voice command.

4. The mobile electronic device of claim 1, wherein the voice command input unit is a microphone.

5. The mobile electronic device of claim 1, wherein the storage system is selected from the group consisting of a read only memory (ROM), an electrically erasable, programmable, read only memory (EEPROM), and a random access memory (RAM).

6. The mobile electronic device of claim 1, wherein the mobile electronic device is a mobile phone or a personal digital assistant.

7. A computer-implemented method for locating a mobile electronic device,
   the method comprising:
   receiving a standard voice command input via a voice command input unit by a user of the mobile electronic device and a voice command identification standard input by the user, and storing the standard voice command and the voice command identification standard in a storage system of the mobile electronic device, wherein the voice command identification standard defines a preset similarity degree between characteristics of any voice command that satisfies the voice command identification standard and characteristics of the standard voice command;

detecting a missed call received by the mobile electronic device while the mobile device is in a silent mode and automatically activating a voice identification function, where the voice identification module is activated only upon receiving a missed call while said mobile device is in a silent mode;

comparing characteristics of a voice command input via the voice command input unit with characteristics of the standard voice command;

determining if the voice command satisfies the voice command identification standard by determining if a similarity degree between each characteristic of the voice command and a corresponding characteristic of the standard voice command satisfies the preset similarity degree; and activating a ringing circuit of the mobile electronic device to play a predetermined ring tone in response that the voice command satisfies the voice command identification standard, so as to help the user locate the mobile electronic device.

8. The method of claim 7, wherein the characteristics of each voice command comprise a frequency, amplitude, a volume and a pulse width of the voice command.

9. The method of claim 7, wherein the voice command input unit is a microphone.

10. The method of claim 7, wherein the storage system is selected from the group consisting of a read only memory (ROM), an electrically erasable, programmable, read only memory (EEPROM), and a random access memory (RAM).

11. The method of claim 7, wherein the mobile electronic device is a mobile phone or a personal digital assistant.

12. A non-transitory computer-readable storage medium storing a set of instructions, the set of instructions capable of being executed by a processor to perform a method for locating a mobile electronic device, the method comprising:

receiving a standard voice command input via a voice command input unit by a user of the mobile electronic device and a voice command identification standard input by the user, and storing the standard voice command and the voice command identification standard in a storage system of the mobile electronic device, wherein the voice command identification standard defines a preset similarity degree between characteristics of any voice command that satisfies the voice command identification standard and characteristics of the standard voice command;

detecting a missed call received by the mobile electronic device while the mobile device is in a silent mode and automatically activating a voice identification function, where the voice identification module is activated only upon receiving a missed call while said mobile device is in a silent mode;

comparing characteristics of a voice command input via the voice command input unit with characteristics of the standard voice command;

determining if the voice command satisfies the voice command identification standard by determining if a similarity degree between each characteristic of the voice command and a corresponding characteristic of the standard voice command satisfies the preset similarity degree; and activating a ringing circuit of the mobile electronic device to play a predetermined ring tone in response that the voice command satisfies the voice command identification standard, so as to help the user locate the mobile electronic device.

13. The storage medium of claim 12, wherein the characteristics of each voice command comprise a frequency, amplitude, a volume and a pulse width of the voice command.

14. The storage medium of claim 12, wherein the voice command input unit is a microphone.

15. The storage medium of claim 12, wherein the storage system is selected from the group consisting of a read only memory (ROM), an electrically erasable, programmable, read only memory (EEPROM), and a random access memory (RAM).

16. The storage medium of claim 12, wherein the mobile electronic device is a mobile phone or a personal digital assistant.

* * * * *